United States Patent [19]

Bender

[11] Patent Number: 4,809,324

[45] Date of Patent: Feb. 28, 1989

[54] SUBSCRIBER LINE INTERFACE CIRCUIT (SLIC) ISOLATION FROM LIGHTING-INDUCED GROUND OVERSHOOTS

[75] Inventor: Bruce D. Bender, Phoenix, Ariz.

[73] Assignee: Siemens Transmission Systems, Inc., Phoenix, Ariz.

[21] Appl. No.: 78,447

[22] Filed: Jul. 27, 1987

[51] Int. Cl.[4] ............................................. H02H 9/04
[52] U.S. Cl. .................................... 379/412; 379/413; 361/56; 361/91
[58] Field of Search ............... 379/399, 412, 413, 405, 379/345, 398, 324, 400; 361/56, 91, 111, 119

[56] References Cited

U.S. PATENT DOCUMENTS

| | | | |
|---|---|---|---|
| 4,158,109 | 6/1979 | Dijkmans et al. | 379/412 X |
| 4,161,633 | 7/1979 | Treiber | 179/170.2 |
| 4,170,740 | 10/1979 | Pernyeszi | 307/251 |
| 4,254,305 | 3/1981 | Treiber | 179/16 F |
| 4,282,555 | 8/1981 | Svedberg | 361/56 |
| 4,398,143 | 8/1983 | Bonis | 379/413 X |
| 4,567,331 | 1/1986 | Martin | 379/405 X |
| 4,612,417 | 9/1986 | Toumani | 379/413 |

OTHER PUBLICATIONS

Publication from IEEE Journal of Solid State Circuits, vol. SC-16, No. 4, Aug. 1981, pp. 261-265.

Primary Examiner—Jin F. Ng
Assistant Examiner—Randall S. Vaas
Attorney, Agent, or Firm—Jeffrey P. Morris

[57] ABSTRACT

The present invention uses the input resistances of transconductance amplifiers in a SLIC to isolate battery ground overshoots from the rest of the SLIC circuitry. This is accomplished by allowing the voltages within each driving operational amplifier to rise with any overshoot, and is achieved by powering each operational amplifier with battery ground voltage, which overshoots, instead of with low voltage ground (LVG), which remains at ground. When a lightning surge hits, an overshoot at the SLIC output will occur. However, since the supply voltage of the driving operational amplifiers rises with the overshoot, the voltage stress to the SLIC circuit components is greatly reduced. The remaining SLIC circuitry stays at a low potential and is isolated from the overshoot. In accordance with the present invention, ground overshoot voltages are isolated across a few high ohmic valued resistors instead of appearing across active circuit components. The present invention is not limited only to the transconductance driven type of SLIC which is described herein by way of example only, but also is applicable to any SLIC circuit by powering the output stage with a battery ground voltage and providing resistive isolation to the rest of the circuitry.

12 Claims, 3 Drawing Sheets

SUBSCRIBER LINE INTERFACE CIRCUIT (SLIC) ISOLATION FROM LIGHTING-INDUCED GROUND OVERSHOOTS

BACKGROUND OF THE INVENTION

1. Field of the Invention

The present invention relates to the field of solid state telephone subscriber line interface circuits (SLIC's) and more particularly to circuitry for isolating and protecting such SLIC circuits from failure due to lightning induced ground overshoots. In accordance with the present invention, a circuit configuration is described wherein isolation through high ohmic value resistors is obtained which substantially reduces the susceptibility of the components of subscriber line interface circuits to damage from lightning.

2. Description of the Prior Art

Subscriber line interface circuits are well known in the prior art and examples of such SLIC circuits which are well known in the prior art are described, for example, in U.S. Pat. No. 4,161,633 of R. Treiber entitled Subcriber Line/Trunk Circuit; and in U.S. Pat. No. 4,254,305 of R. Treiber entitled Current Limited Subscriber Line Feed Circuit. Telephone equipment has in the past used transformer based circuits to interface to the telephone subscriber line. With the advent of improved cost and performance parameters of integrated circuit technology, solid state subscriber line interface circuits have been designed and are in use in the telecommunications industry. An example of a high voltage switch and capacitive drive circuit manufactured on an IC which is used in a telephone subscriber line circuit is described in U.S. Pat. No. 4,170,740 to J. Pernyeszi, entitled High Voltage Switch and Capacitive Drive. The subscriber line interface circuits of the known prior art, such as aforementioned, are difficult to protect from lightning induced voltages on the telephone subscriber line since such SLIC circuits are directly coupled to the line. Typical subscriber line interface circuits of the prior art use circuitry such as is described in FIG. 1 of the present application for protection from lightning induced voltages. The output stage of such a known prior art SLIC consists of two operational amplifiers configured as differential transconductance amplifiers wherein each such transconductance amplifier outputs a current which is linearly dependent on its differential input voltage. Such a SLIC output configuration is described in detail in the literature of the known prior art, such as in the IEEE Journal of Solid State Cicuits, Vol. SC-16, No. 4, Aug. 1981, pp 261-265. Such a prior art SLIC is powered from ground to battery voltage (-50 V) and operates around a Quiescent point at half battery voltage (-25 V). Such a circuit of FIG. 1 of the known prior art has the deficiency that any overshoot of battery ground (BG) is forced onto the output of the SLIC. Forcing the output to a level far above the low voltage ground (LVG), which is the most positive voltage of the SLIC output stage, usually results in destruction of the circuit components. In contradistinction, the circuit of the present invention provides an improved subscriber line interface cirucit which is not susceptible to lightning induced ground overshoots.

SUMMARY OF THE INVENTION

The present invention uses the input resistances of transconductance amplifiers in a SLIC to isolate battery ground overshoots from the rest of the SLIC circuitry. This is accomplished by allowing the voltages within each driving operational amplifier to rise with any overshoot, and is achieved by powering each operational amplifier with battery ground voltage, which overshoots, instead of with low voltage ground (LVG), which remains at ground. When a lightning surge hits, an overshoot at the SLIC output will occur. However, since the supply voltage of the driving operational amplifiers rises with the overshoot, the voltage stress to the SLIC circuit components is greatly reduced. The remaining SLIC circuitry stays at a low potential and is isolated from the overshoot.

In accordance with the present invention, ground overshoot voltages are isolated across a few high ohmic valued resistors instead of appearing across active circuit components. The present invention is not limited only to the transconductance driven type of SLIC which is described herein by way of example only, but also is applicable to any SLIC circuit by powering the output stage with a battery ground voltage and providing resistive isolation to the rest of the circuitry.

DESCRIPTION OF THE PREFERRED EMBODIMENT

Figure 1:
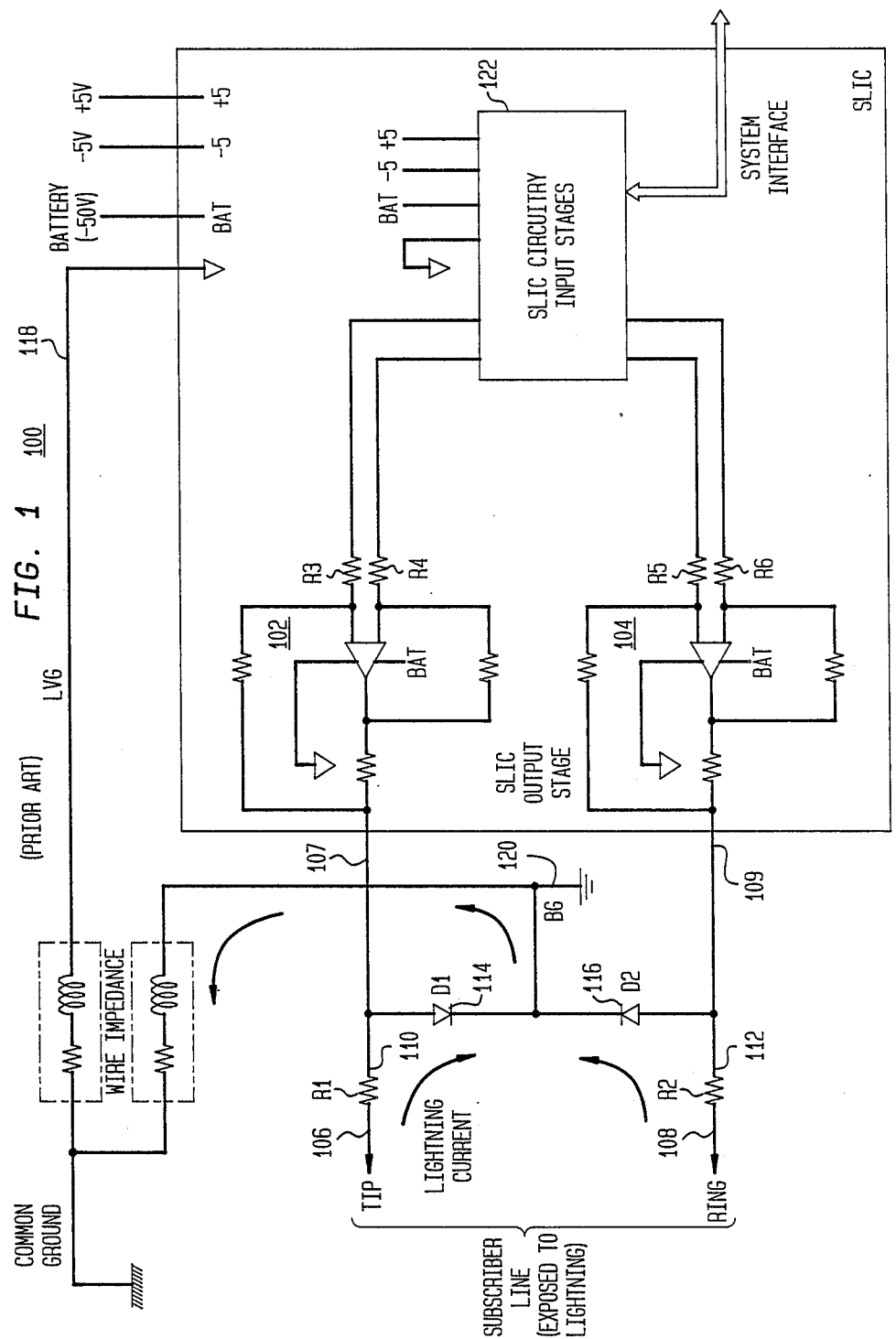
FIG. 1 shows a prior art SLIC circuit including lightning protection circuitry.

Referring now to FIG. 1, an output stage of a typical SLIC of the prior art incorporating protection from lightning induced voltages is illustrated generally at 100. The output stage of the SLIC comprises a pair of operational amplifiers 102 and 104 which are configured as differential transconductance amplifiers. Such transconductance amplifiers generate an output current which is linearly dependent on the differential input voltages applied thereto. The circuit is powered from ground to a battery voltage of -50 volts and operates around a quiescent point at a half battery voltage of -25 volts. The tip and ring lines of the circuit are exposed to the telephone subscriber line at 106 and 108 respectively. Protection from lightning currents is accomplished by means of resistors R1 and R2 at 110 and 112 respectively, and diodes D1 and D2 at 114 and 116 respectively. Diodes 114 and 116 clamp the voltage at the SLIC output to ground during positive lightning surges. Resistors 110 and 112 establish a current level through the diodes 114 and 116. Typical values of resistors 110 and 112 vary from 25 to 100 ohms each which allow peak currents of 10 to 40 amps per lightning current loop through the diodes 114 and 116 for a 1,000 volt lightning induced surge. Two ground leads are shown in FIG. 1. An electronic or low voltage ground LVG is illustrated at 118 and the battery ground BG is illustrated at 120. The low voltage ground LVG is the system reference for all signals, analog and digital and for powering the line circuit. The low voltage ground cannot be used for lightning induced currents since signal disruptions would occur in other equipment sharing this common ground. Microprocessors which service the line equipment are particularly vulnerable to variations in the signal level in the low voltage ground.

Hence, the battery ground BG at 120 is normally used in circuits of the prior art as illustrated in FIG. 1, for carrying lightning currents.

In single point grounding arrrangements which are often used in telephone equipment, the low voltage ground LVG and the battery ground BG will have separate leads back to a common ground where the telephone battery equipment is located. In a telephone central office environment such leads may be several hundred feet long which creates a significant impedence, which is primarily inductive, between the grounds. As a result of this created impedence, typical lightning surges result in an overshoot of up to 100 volts or more in the battery ground BG. When the battery ground BG overshoots, the low voltage ground LVG which carries no lightning current remains steady and unaffected. As can be seen from FIG. 1, any voltage overshoot of the, batter ground BG is forced onto the output of the SLIC at lines 107 and 109. By forcing the SLIC output far above the low voltage ground LVG, which is the most positive voltage of the SLIC output stage, the SLIC circuit components are usually destroyed resulting in failure of the line circuit. The portion of the SLIC circuitry which is not associated with the lightning protection circuitry is not described, and is illustrated generally at 122.

Figure 2:
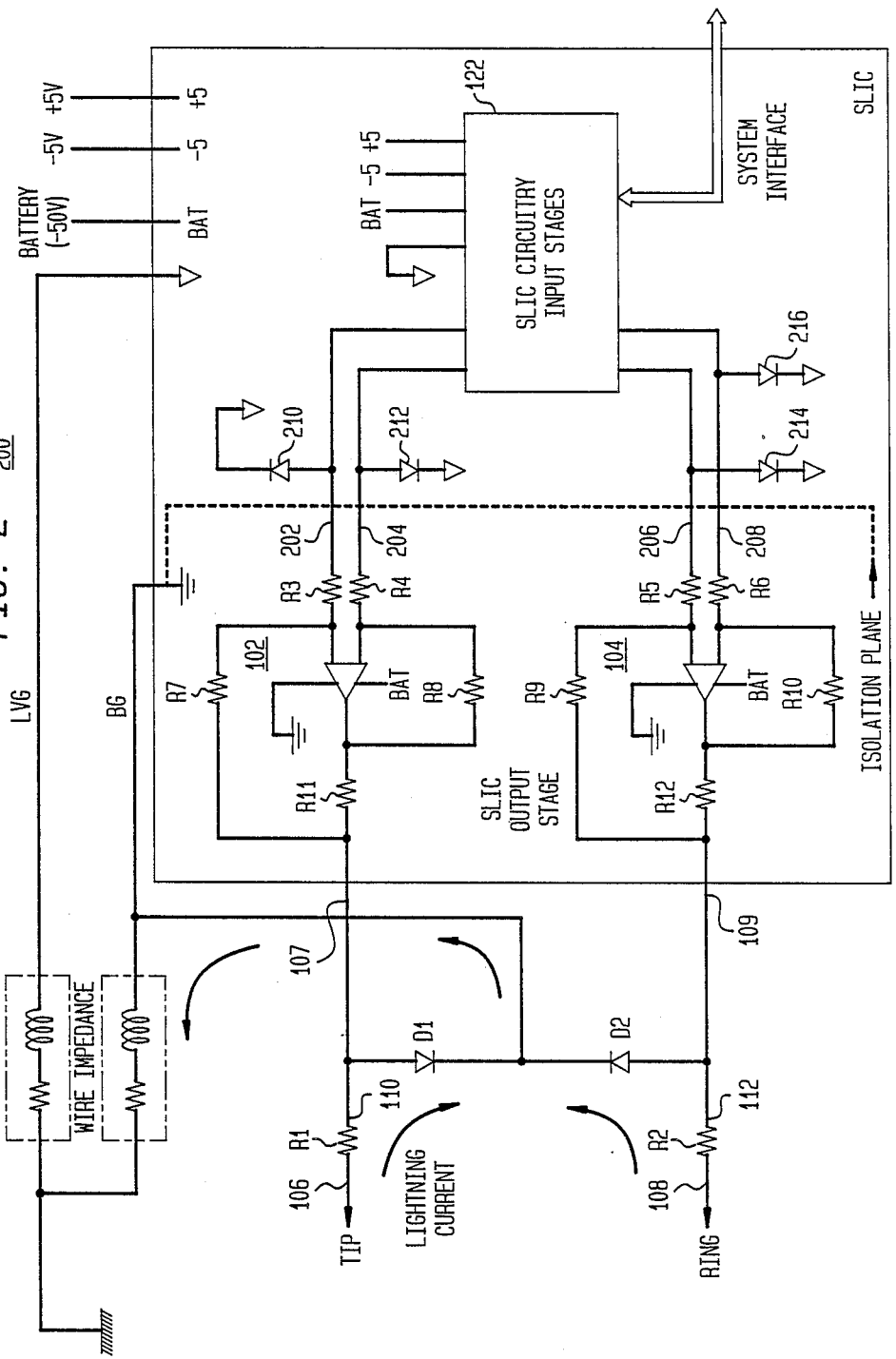
FIG. 2 shows a subscriber line interface circuit arrangement incorporating the isolation and lightning protection circuit of present invention.

Referring now to FIG. 2, a schematic diagram illustrative of a SLIC output circuit in accordance with the Present invention is illustrated generally at 200 with reference to which the present invention is described. More specifically, the input resistors of each of the transconductance amplifiers 102 and 104 are utilized to isolate the battery ground (BG) overshoots from the rest of the SLIC circuitry. The input resistors for transconductance amplifier 102 are shown as resistors 202 and 204 and the input for transconductance amplifier 104 are shown as resistors 206 and 208 respectively. In accordance with the circuit of FIG. 2, wherein like components as in FIG. 1 are shown with like circuit designations, the voltages within each of the driving operational amplifiers 102 and 104 are allowed to rise with any lightning induced overshoot. This is accomplished by powering each of the operational amplifiers 102 and 104 with battery ground BG which overshoots instead of with low voltage ground voltage (LVG), which remains at ground. When a lightning surge hits, an overshoot at the SLIC output on lines 107 and 109 will occur as before. However, and in accordance with the circuit of FIG. 2, the supply voltage of the driving operational amplifiers 102 and 104 rises with the overshoot and the voltage differentials in the overall SLIC circuit components are thereby greatly reduced. The remaining SLIC circuitry, which remains at a low potential is isolated from the overshoot by resistors 202, 204, 206 and 208. This configuration of the transconductance amplifiers 102 and 104 allows the use of high ohmic value input resistors of 100,000 ohms or more. The small currents generated through these resistances R3, R4, R4 and R6 at 202, 204, 206 and 208 respectively is easily drained through diodes 210, 212, 214 and 216 to LVG. An isolation plane is thus established as indicated by the dotted line.

The actual degree of isolation possible depends on the breakdown voltage of the resistors 202 through 208. When resistors 202 through 208 are integrated, they must be isolated from the subtrates of the rest of the integrated circuitry. Thin film resistors which are deposited on the integrated circuit rather than diffused into the substrate are preferrable for this purpose. Additionally, the substrates of the driving amplifiers 102 and 104 must be isolated from all other substrates. This may be accomplished by splitting the circuitry into two separate integrated circuits or by using a dielectric isolation technology in a single integrated circuit. In accordance with FIG. 2, it can be seen that ground overshoot voltages are isolated across a few high value resistors 202, 204, 206 and 208 instead of appearing across active components as in the prior art as illustrated by FIG. 1.

The SLIC output stage shown in FIG. 2 includes differential transconductance amplifiers 102 and 104. A transconductance amplifier generates a current which is linearly dependant on its differential input voltage. It consists of an operational amplifier and five resistors as shownin the figures.

Values of R3 through R6 and R7 through R10 can be in the ten to several hundred kilo-ohm range while R11 and R12 is usually between ten and a hundred ohms. The transconductance used in SLIC circuits is usually between 1 to 20 mA/V.

In SLIC applications, the two transconductance amplifiers are used to drive the tip and ring leads of the subscriber line. Through these amplifiers, the SLIC performs the following functions; outputs dc feed current to the subscriber; outputs the receive voice signal to the subscriber; synthesizes a differential input impedance across the subscriber line; and synthesizes a common mode impedance from the subscriber line to ground.

The signal processing required to perform the above functions is accomplished by the SLIC circuitry 122, is well known from the aforementioned prior art and does not form a part of the present invention. This known circuitry 122 takes voltage inputs from several sources and outputs the appropriate voltages to the output stage (the inputs to the transconductance amplifiers). The transconductance amplifiers take these inputed voltages and generate a corresponding current in the line. This configuration is well suited for impedance synthesizing where a sensed voltage controls the output current.

Figure 3:
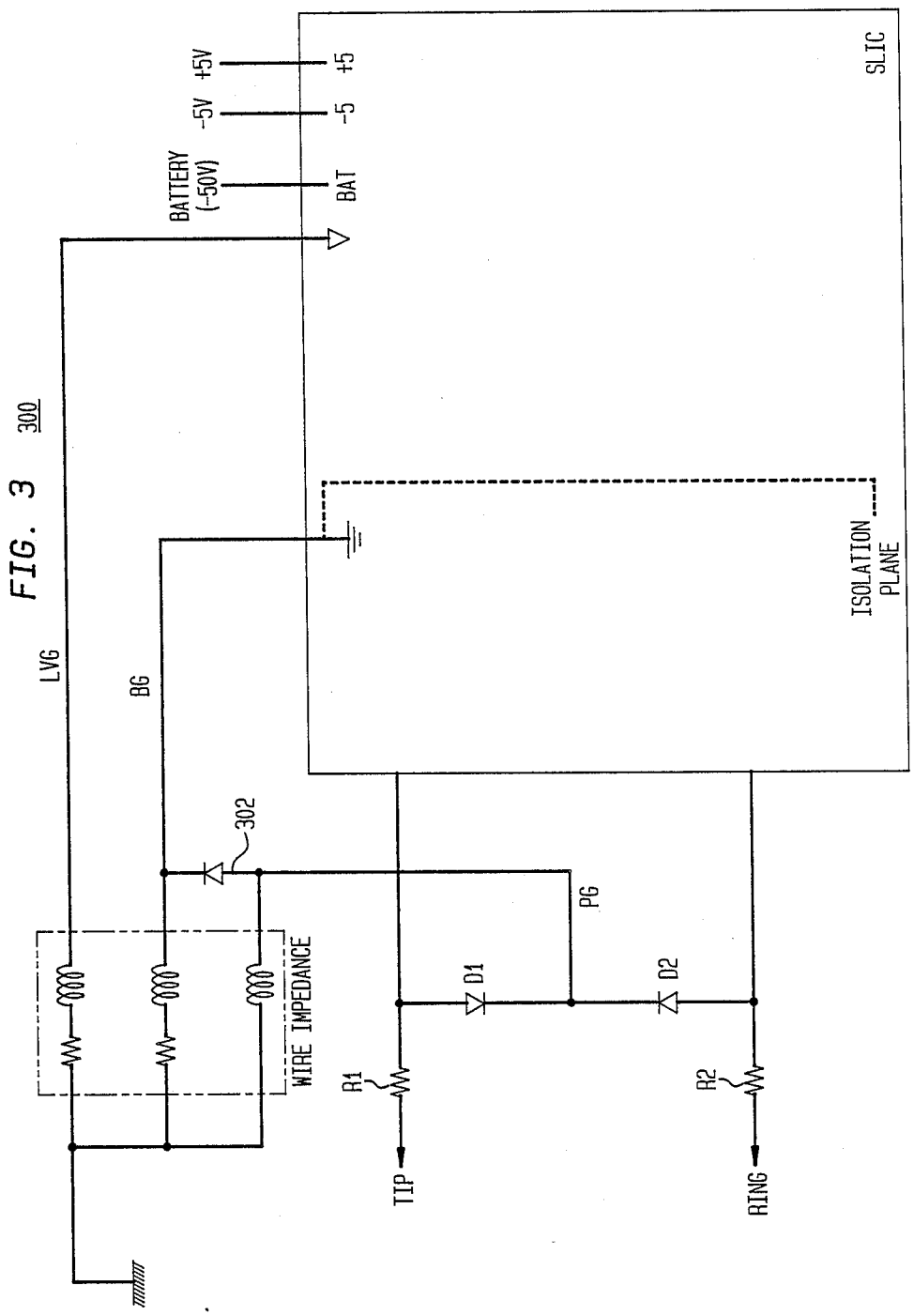
FIG. 3 shows an additional aspect of the lightning protection circuitry of the present invention.

Referring now to FIG. 3, an embodiment of the present invention wherein a protection ground PG is supplied for the purpose of carrying lightning currents is generally shown at 300. Even when such a protection ground PG is comprised of very heavy wire, it will still cause a voltage overshoot during a lightning induced voltage surge due to inductance. In this case the protection ground PG and the battery ground BG must be coupled together with a constant voltage device such as a diode or a zener diode as shown at 302 in FIG. 3. This configuration allows the potential of the driving amplifiers 102 and 104 to rise with the voltage overshoot but at a lower offset. The maximum offset which is permissable is a function of the particular integrated circuit technology employed.

While the present invention has been described in connection with the preferred embodiment thereof, it is to be understood that additional embodiments, modifications and applications which will become obvious to those skilled in the art are included in the spirit and scope of the invention as set forth by the claims appended hereto.

What is claimed is:

1. A telephone subscriber line interface circuit having improved isolation between a two-wire subscriber line having a ground cable impedance and the input stages of said subscriber line interface circuit, comprising:

a pair of subscriber line feed resistance means, each of said line feed resistance means being coupled to one of the wires of said two-wire subscriber line;

a high voltage dc battery having a battery ground coupled to said subscriber line via said line feed resistance means;

a low voltage dc voltage source having a low voltage ground;

a pair of drive amplifiers comprising the output stage of said subscriber line interface circuit, each of said drive amplifiers being powered by said high voltage dc battery and battery ground, and having an output coupled in series respectively to one of said line feed resistance means;

input resistance means having a high ohmic value coupled to the inputs of each of said drive amplifiers and to the input stages of said subscriber line interface circuit, such that lightning induced voltages on said subscriber line are isolated from the input stages of said subscriber line interface circuit by said input resistance means, and where in the voltage of said battery ground powering said drive amplifiers increases with voltage induced at the outputs of said drive amplifiers due to large current flow through ground cable impedance during a lightning strike, and wherein said circuit is configured as an integrated circuit fabricated on a substrate material and having said input resistance means electrically isolated from the substrate material.

2. A telephone subscriber line interface circuit in accordance with claim 1 wherein said ohmic value of said input resistance means is equal to or greater than one hundred thousand ohms.

3. A telephone subscriber line interface circuit in accordance with claim 1 wherein said drive amplifiers are operational amplifiers.

4. A telephone subscriber line interface circuit in accordance with claim 1 wherein said drive amplifiers are transconductance amplifiers.

5. A telephone subscriber line interface circuit in accordance with claim 4 wherein said transconductance amplifiers are differential transconductance amplifiers having an output current linearly dependent on the differential input voltage thereto.

6. A telephone subscriber line interface circuit in accordance with claim 1 further comprising:

first diode means coupled to said subscriber line feed resistors for clamping said lightning induced voltages to said battery ground.

7. A telephone subscriber line interface circuit in accordance with claim 6 further comprising:

second diode means coupled between said input resistance means and said low voltage ground.

8. A telephone line interface circuit in accordance with claim 1 wherein said input resistance means are comprised of thin film resistors deposited on said integrated circuit.

9. A telephone line interface circuit in accordance with claim 8 wherein said drive amplifiers are configured on substrate s of said integrated circuit which are electrically isolated from the substrates of the input stages of said line circuit.

10. A telephone line interface circuit in accordance with claim 1 further comprising:

a protection ground wire; and a constant voltage device for coupling said protection wire to said battery ground.

11. A telephone line interface circuit in accordance with claim 10 wherein said constant voltage device is a diode.

12. A telephone line interface circuit in accordance with claim 10 wherein said constant voltage de vice is a zener diode.

* * * * *